United States Patent

Kawamura et al.

Patent Number: 5,282,144
Date of Patent: Jan. 25, 1994

[54] CYLINDRICAL INTERPOLATION SYSTEM

[75] Inventors: Hideaki Kawamura; Takao Sasaki, both of Tokyo, Japan

[73] Assignee: Fanuc Ltd., Minamitsuru, Japan

[21] Appl. No.: 820,665

[22] PCT Filed: May 26, 1991

[86] PCT No.: PCT/JP91/00584
§ 371 Date: Jan. 17, 1992
§ 102(e) Date: Jan. 17, 1992

[87] PCT Pub. No.: WO91/18335
PCT Pub. Date: Nov. 28, 1991

[30] Foreign Application Priority Data

May 24, 1990 [JP] Japan .................. 2-134836

[51] Int. Cl.$^5$ ............................. G05B 19/415
[52] U.S. Cl. .................. 364/474.31; 364/474.18; 364/474.36; 318/572; 318/573
[58] Field of Search ......... 364/474.18, 474.28, 364/474.29, 474.3, 474.31, 474.35, 474.36; 318/568.15, 569, 570, 572, 573

[56] References Cited

U.S. PATENT DOCUMENTS

| | | | |
|---|---|---|---|
| 4,598,380 | 7/1986 | Holmes et al. | 364/474.3 |
| 4,811,235 | 3/1989 | Shirakata | 364/474.36 |
| 4,878,171 | 10/1989 | Kiya et al. | 364/474.31 |
| 4,959,597 | 9/1990 | Kawamura et al. | 364/474.18 |
| 5,065,333 | 11/1991 | Kawamura et al. | 364/474.36 |
| 5,146,410 | 9/1992 | Kawamura et al. | 364/474.31 |
| 5,153,490 | 10/1992 | Ueta et al. | 364/474.35 |

Primary Examiner—Jerry Smith
Assistant Examiner—Thomas E. Brown
Attorney, Agent, or Firm—Staas & Halsey

[57] ABSTRACT

A cylindrical interpolation system for machining a cylindrical surface of a cylindrical workpiece, wherein a tool diameter correcting means (104) obtains a tool center path by calculating a tool diameter offset vector for a machining shape specified with reference to an assumed orthogonal coordinate system, and an interpolating means (107) interpolates the tool center path and outputs an interpolation pulse (PCyi) related to an assumed linear axis and an interpolation pulse (PZi) related to a cylindrical axis. To effect a reverse conversion from the assumed orthogonal coordinate system to the cylindrical coordinate system, a pulse converting means (108) converts the interpolation pulse (PCyi) into an interpolation pulse (PCi) for rotating the rotary axis. A block-start correction component calculating means (105) and synchronous correction component calculating means (109) calculate correction components (Vcy, ΔVcy), and these correction components (Vcy, ΔVcy) are interpolated by a block-start correction component interpolating means (106) and synchronous correction component interpolating means (110), and added to the interpolation pulse (PCi) for rotating the rotary axis. As a result, the tool cutting surface can be always located immediately above the axis of rotation of the workpiece, and the side surface being machined is at a right angle to the cylindrical surface of the workpiece.

6 Claims, 10 Drawing Sheets

FIG. 10

CYLINDRICAL INTERPOLATION SYSTEM

TECHNICAL FIELD

This invention relates to a cylindrical interpolation for machining a cylindrical surface of a cylindrical workpiece by a numerical control device, and more particularly, to a cylindrical interpolation system in which a tool cutting surface is always located at right angles to the cylindrical surface.

BACKGROUND ART

When carrying out a complicated groove cutting in a cylindrical workpiece, using an end mill at a machining center or the like, the machining operation is effected by controlling a cylindrical axis (Z) and a rotary axis (C), and for such a machining, a cylindrical interpolation system is widely used to facilitate the preparation of a machining program.

Figure 9:
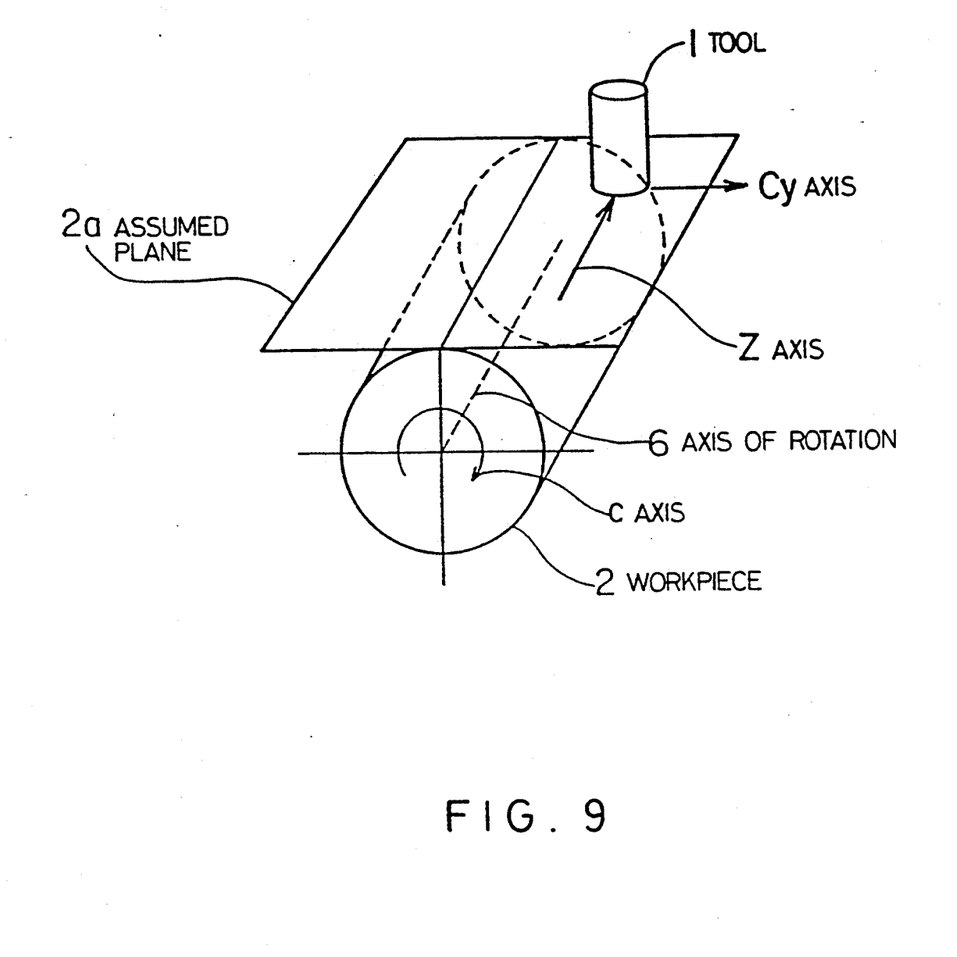
FIG. 9 is a diagram illustrating a cylindrical interpolation system.

FIG. 9 illustrates the cylindrical interpolation system, wherein a cylindrical surface is developed as an assumed plane 2a and an assumed orthogonal coordinate system is established based on the Z axis and an assumed linear axis Cy. This coordinate system is identical to a usual plane coordinate system, and a path of a tool 1 with reference to the orthogonal coordinate system is derived by a program. Since the shape to be machined is programmed with reference to a cylindrical coordinate system, it is converted into the assumed orthogonal coordinate system. After the interpolation for the Z and Cy axes is effected with reference to the orthogonal coordinate system, the amount of movement of the Cy axis is converted back (from the orthogonal coordinate system to the cylindrical coordinate system) into an amount of rotation of the axis of rotation (C axis) 6 of a workpiece 2, to thereby control the C axis. Such a cylindrical interpolation system permits an easy preparation of a program for a complicated groove cutting.

Figure 10:
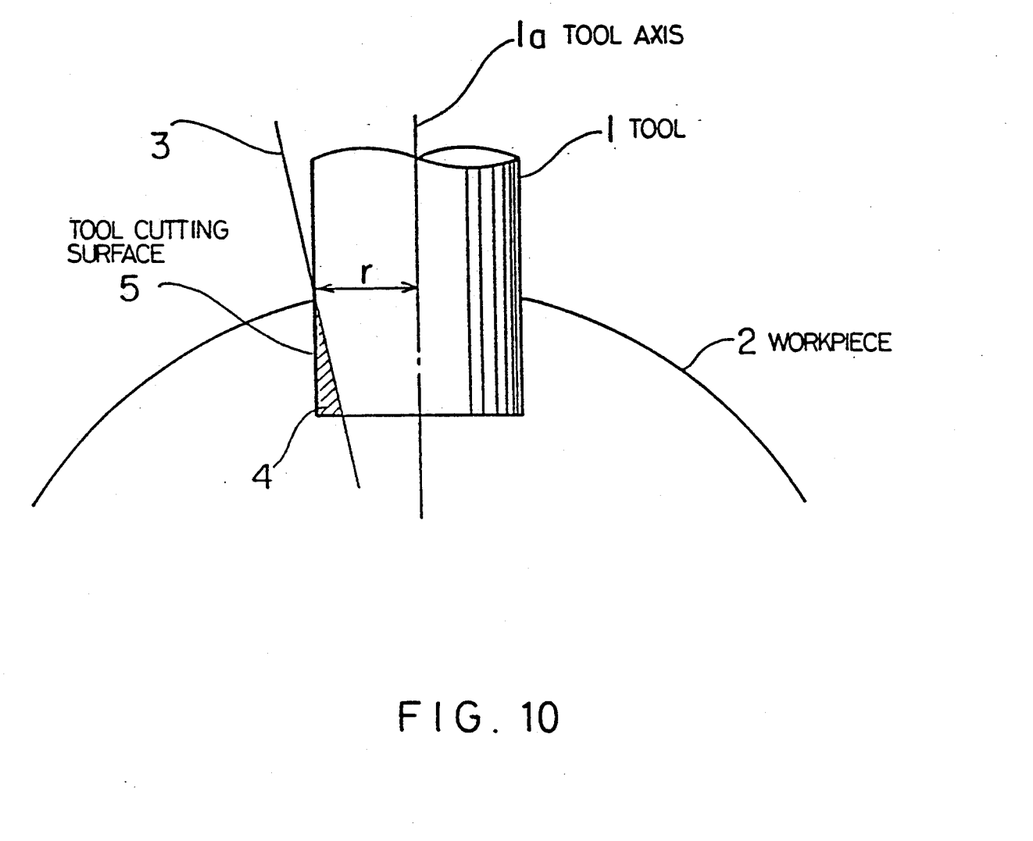
FIG. 10 is a diagram illustrating the relationship between a tool and a workpiece during a groove cutting by a prior art cylindrical interpolation system.

Nevertheless, in the prior art cylindrical interpolation system, the tool cutting surface is not always at right angles to the cylindrical surface. FIG. 10 shows the relationship between a tool and a workpiece during groove cutting according to a prior art cylindrical interpolation, in which a tool axis 1a is controlled so that it is at right angles to the cylindrical surface of the workpiece 2, and therefore, the tool cutting surface 5 and a line 3 perpendicular to the cylindrical surface of the workpiece 2 form a constant angle therebetween. As a result, a hatched portion 4 is cut unnecessarily, and thus a desired machining cannot be carried out.

DISCLOSURE OF THE INVENTION

This invention was created in view of the above circumstances, and an object thereof is to provide a cylindrical interpolation system for correcting a tool position in accordance with a tool contact vector, which is a vector from the center of a tool to a cutting point (point of contact) of the tool, such that the tool cutting surface is always at a right angle to the cylindrical surface.

To achieve the above object, this invention provides a cylindrical interpolation system for machining a cylindrical surface of a cylindrical workpiece, comprising tool diameter correcting means for obtaining a tool center path by calculating a tool diameter offset vector in an assumed plane defined by a cylindrical axis and an assumed linear axis obtained through a development of the cylindrical surface, interpolating means for interpolating the tool center path and outputting a first interpolation pulse related to the assumed linear axis and a second interpolation pulse related to the cylindrical axis, pulse converting means for converting the first interpolation pulse into a third interpolation pulse related to a rotary axis, correction component calculating means for calculating a correction component of a tool contact vector in a direction of the assumed linear axis from the tool diameter offset vector, correction component interpolating means for interpolating the correction component and outputting a first correction pulse related to the rotary axis and a second correction pulse related to an axis perpendicular to the cylindrical axis, and an adder for adding the third interpolation pulse and the first correction pulse and providing an output pulse for the rotary axis.

The tool diameter correcting means obtains a tool center path by calculating a tool diameter offset vector with respect to a machining shape specified by the assumed orthogonal coordinate system, and the interpolating means interpolates the tool center path and outputs a first interpolation pulse related to the assumed linear axis and a second interpolation pulse related to the cylindrical axis. To carry out a reverse conversion from the assumed orthogonal coordinate system to the cylindrical coordinate system, the pulse converting means converts the first interpolation pulse into a third pulse for rotating the rotary axis.

The correction component calculating means obtains a correction component of the tool contact vector in the direction of the assumed linear axis, and the correction component interpolating means shifts the tool position by the correction component, and at the same time, rotates the workpiece.

As a result, the tool cutting surface is controlled such that it is always located immediately above the axis of rotation of the workpiece, and thus the side of the surface being machined is at a right angle to the cylindrical surface of the workpiece.

BEST MODE OF CARRYING OUT THE INVENTION

An embodiment of this invention will be described with reference to the drawings.

Figure 2A:
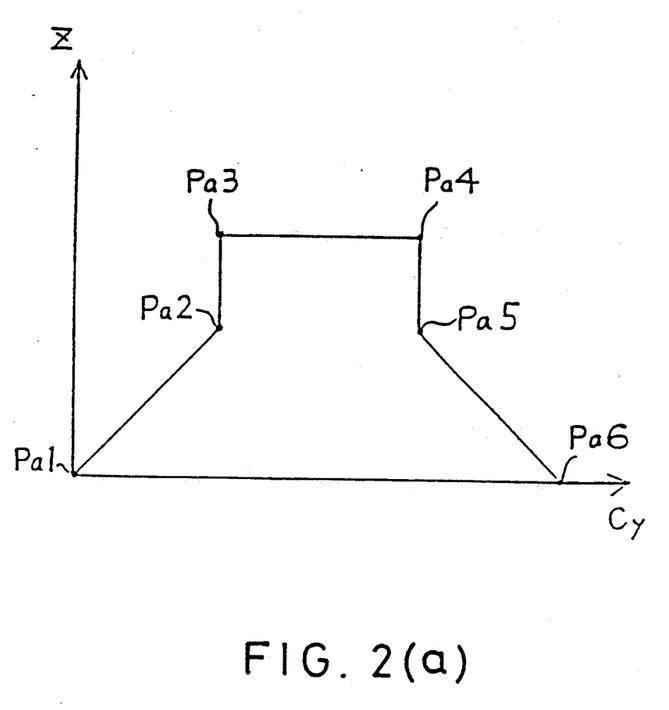
FIG. 2(a) and FIG. 2(b) are diagrams illustrating the concept of correcting a tool position according to the cylindrical interpolation system of this invention.
Figure 2B:
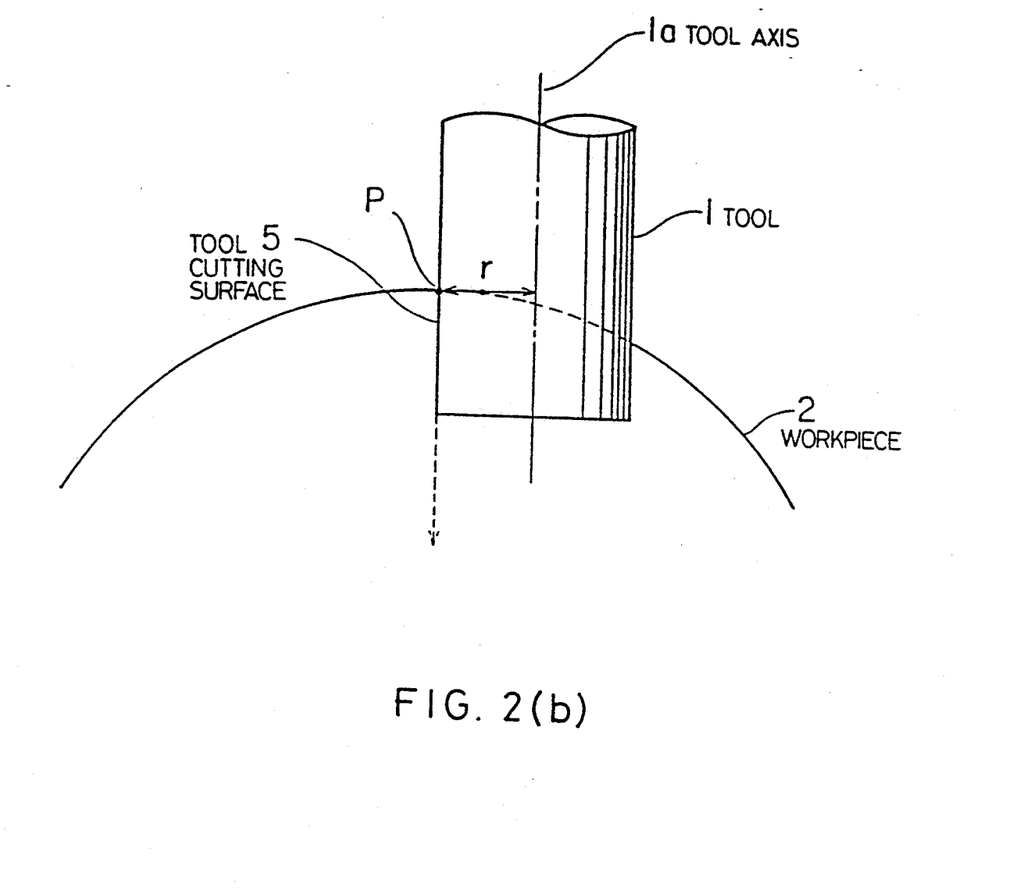

FIG. 2(a) and FIG. 2(b) illustrate the concept of tool position correction adopted in a cylindrical interpolation system according to this invention, wherein FIG. 2(a) shows a development of a machining path onto an assumed plane, the machining path starting at a point Pa1, passing points Pa2, Pa3, Pa4 and Pa5, and ending at a point Pa6.

FIG. 2(b) illustrates a tool position correction effected white the machining is executed along a straight section Pa2-Pa3 shown in FIG. 2(a). To bring a tool cutting surface 5 of a tool 1 to a position coinciding with a line perpendicular to the cylindrical surface of a workpiece 2, a tool axis 1a must be moved by a distance corresponding to a tool radius r such that the tool cutting surface 5 has a point P immediately above the axis of rotation of the workpiece 2. If, however, the tool 1 atone is moved, the relationship between the workpiece and the tool varies, and therefore, it is not advisable to merely move the tool alone.

Figure 3:
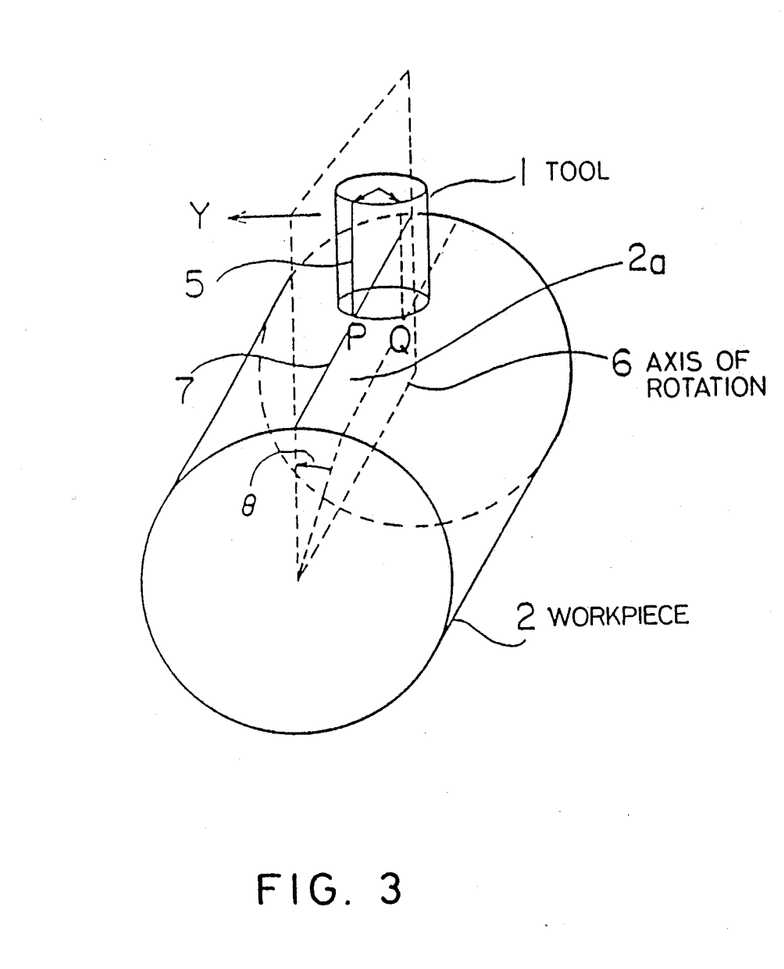
FIG. 3 and FIG. 4 are diagrams illustrating the principle of this invention.
Figure 4:
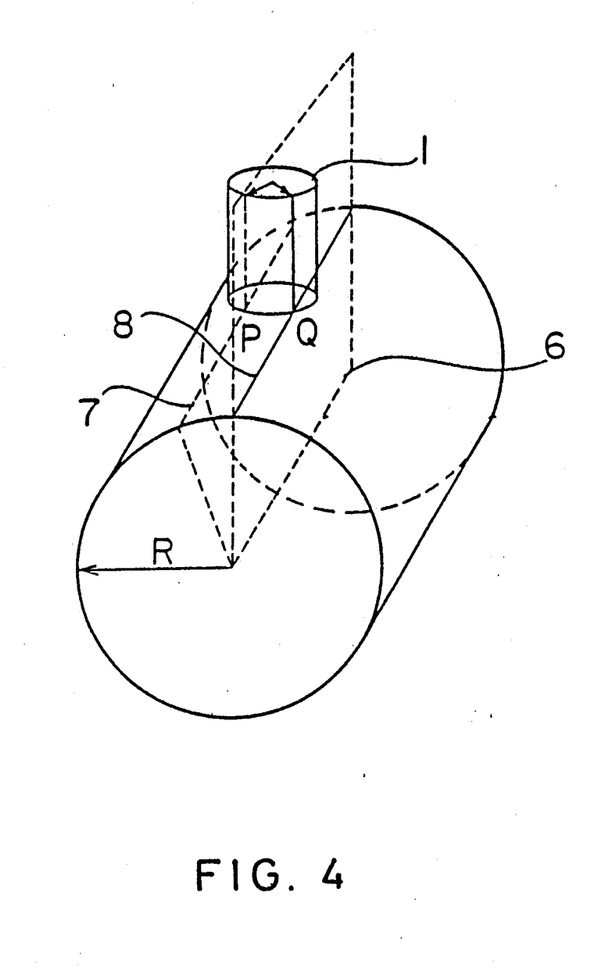

FIG. 3 and FIG. 4 illustrate the principle of this invention. In FIG. 3, the point P on the tool cutting surface is on a line 7 extending immediately above the axis of rotation 6 of the workpiece 2. Accordingly, when a point Q is to be contained in the tool cutting surface it must be moved onto the line 7, but if the tool is merely moved in a Y-axis direction, the relationship of the relative positioning between the assumed plane 2a developing the cylindrical surface of the workpiece 2 and the tool 1 varies. Therefore, to avoid this, white the tool 1 is moved in the Y-axis direction, the workpiece 2 is simultaneously rotated by an angle θ about the axis of rotation 6. FIG. 4 shows a state in which the tool 1 has been moved in the Y-axis direction, and at the same time, the workpiece 2 has been rotated by the angle θ. Namely, a line 8, not the line 7, is now located immediately above the axis of rotation 6 of the workpiece 2. The angle θ is derived by the following equation:

$$\theta = (Vcy/R)*(180/\pi) \quad (1)$$

where Vcy represents the amount of movement of the tool 1 in the Y-axis direction, and R represents the radius of the workpiece 2.

Figure 5:
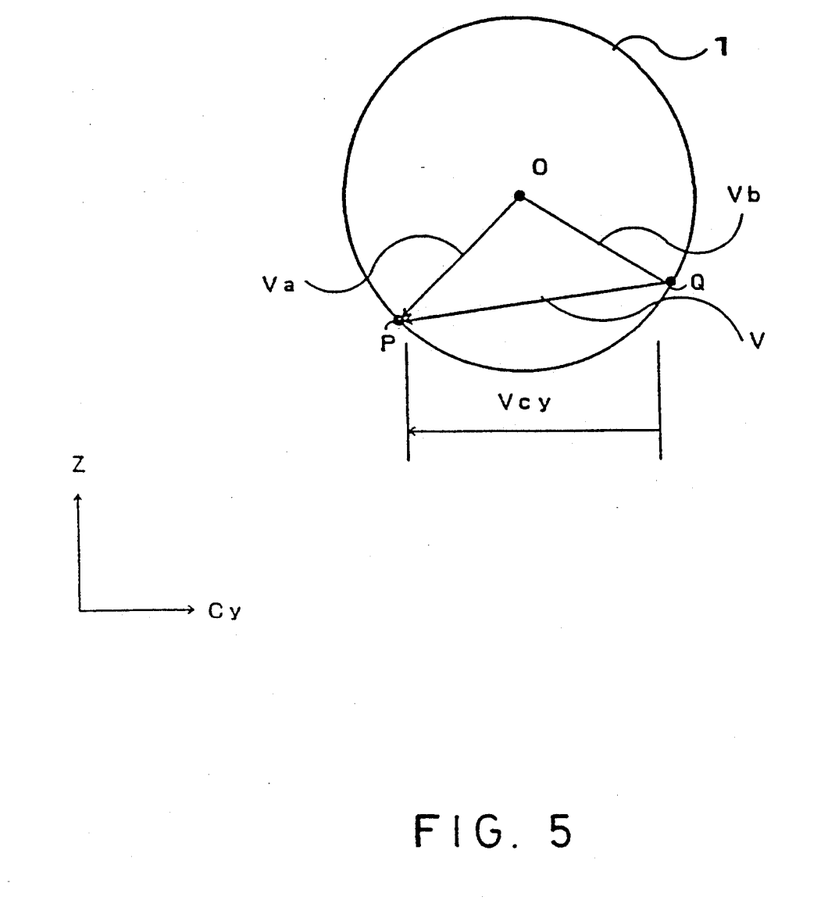
FIG. 5 is a plan view illustrating the relationship between a tool contact vector and a tool position correction value in a Y-axis direction.

FIG. 5 is a plan view showing the relationship between the tool and a tool contact vector. As shown in FIG. 3, the tool contact point is first located at P, and then shifted to the point Q for the subsequent machining operation. Namely, first the tool contact vector is Va, and is then Vb, based on the center 0 of the tool 1, i.e., the tool contact vector changes from Va to Vb. Accordingly, it follows that, if a difference Vcy between the tool contact vectors Va and Vb in the direction of the assumed linear axis Cy is obtained, and the tool 1 is moved by Vcy in the Y-axis direction white the workpiece 2 is rotated over the corresponding angle θ, the tool contact point Q can be shifted to a position immediately above the axis of rotation 6, and at the same time, the relationship of relative positioning between the assumed plane 2a of the workpiece 2 and the tool 1 is maintained.

Generally, the tool contact vector is rotated when a tool offset vector is varied. Namely, the tool offset vector and the tool contact vector have the same magnitude but opposite directions. Accordingly, in a linear interpolation, the tool offset vector changes in individual blocks, and thus the rotation of the tool contact vector may be processed in individual blocks. In a circular interpolation, the tool offset vector changes in accordance with pulse distribution, and therefore, the tool contact vector varies in accordance therewith. Accordingly, the tool 1 must be moved in the Y-axis direction simultaneously with the circular interpolation, white the workpiece 2 is rotated.

Figure 6:
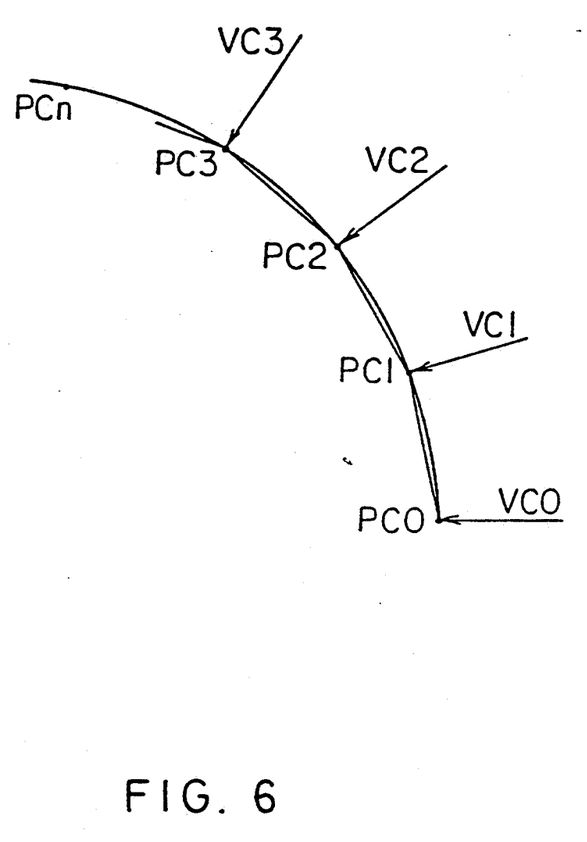
FIG. 6 is a diagram illustrating a change of the tool contact vector during a circular interpolation.

FIG. 6 shows a change of the tool contact vector during a circular interpolation. It is assumed that the current tool contact point is at a point PCO and the tool contact vector is VCO. If the tool contact point is to be shifted next to a point PC1 by a circular interpolation (an interpolation by a linear approximation), the tool contact vector changes from VC0 to VC1, and accordingly, the tool 1 must be moved in the Y-axis direction by a distance corresponding to a Cy-axis component of the difference between these tool contact vectors, and the workpiece 2 must be rotated over an angle corresponding to the Cy-axis component. A similar process may be effected when the tool contact point is shifted in the sequence of PC2, PC3 and PCn.

Figure 7:
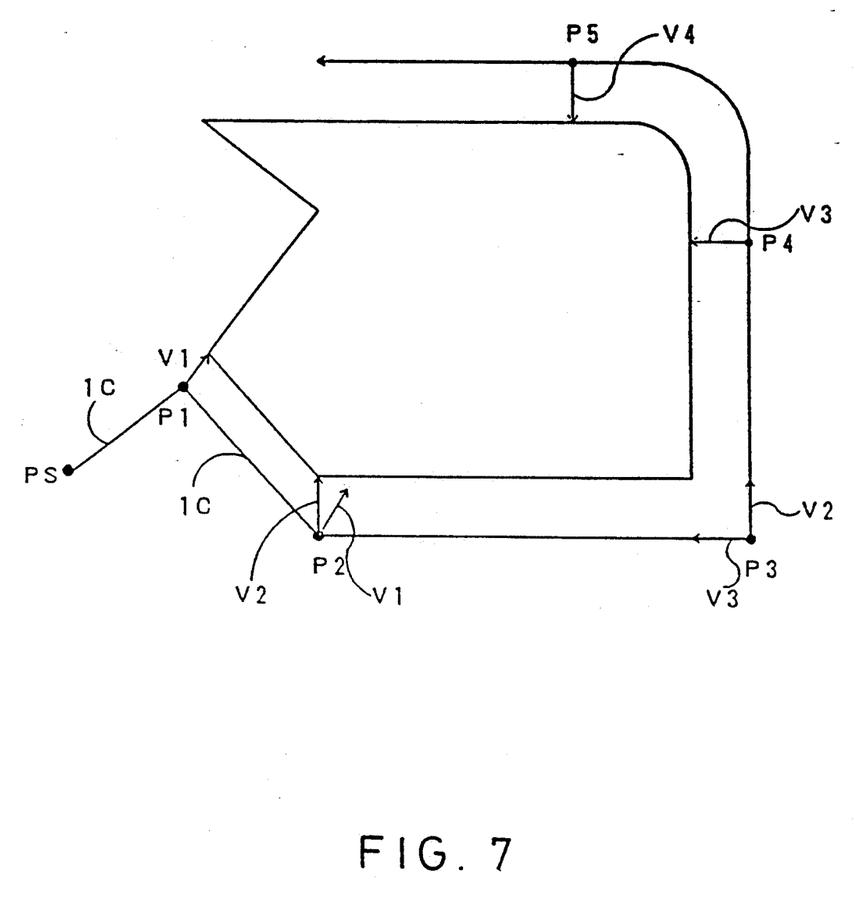
FIG. 7 is a diagram illustrating the relationship between a tool center path and the tool contact vector.

FIG. 7 shows the relationship between the tool center path and the tool contact vector. The tool center is successively moved from a point Ps to points P1, P2, P3, P4 and P5. The tool center path is indicated by 1C. At the point P1, the tool contact vector is V1, and is changed to V2 as the tool center is shifted to the point P2. For the point P3, the vector is changed from V2 to V3. To make each new tool contact point coincide with the axis of rotation of the workpiece, the tool 1 is moved in the Y-axis direction by a Y-axis component of the difference between the previous and the next tool contact vectors, and simultaneously, the workpiece 2 is rotated by an amount corresponding to the amount of movement in the Y-axis direction.

For an arcuate section from the point P4 to P5, the tool contact vector is varied at each circular interpolation in such a manner that the tool 1 is moved in the Y-axis direction, and simultaneously, pulses equivalent to an angle corresponding to the Y-axis movement of the workpiece 2 are added to C-axis interpolation pulses.

Figure 8:
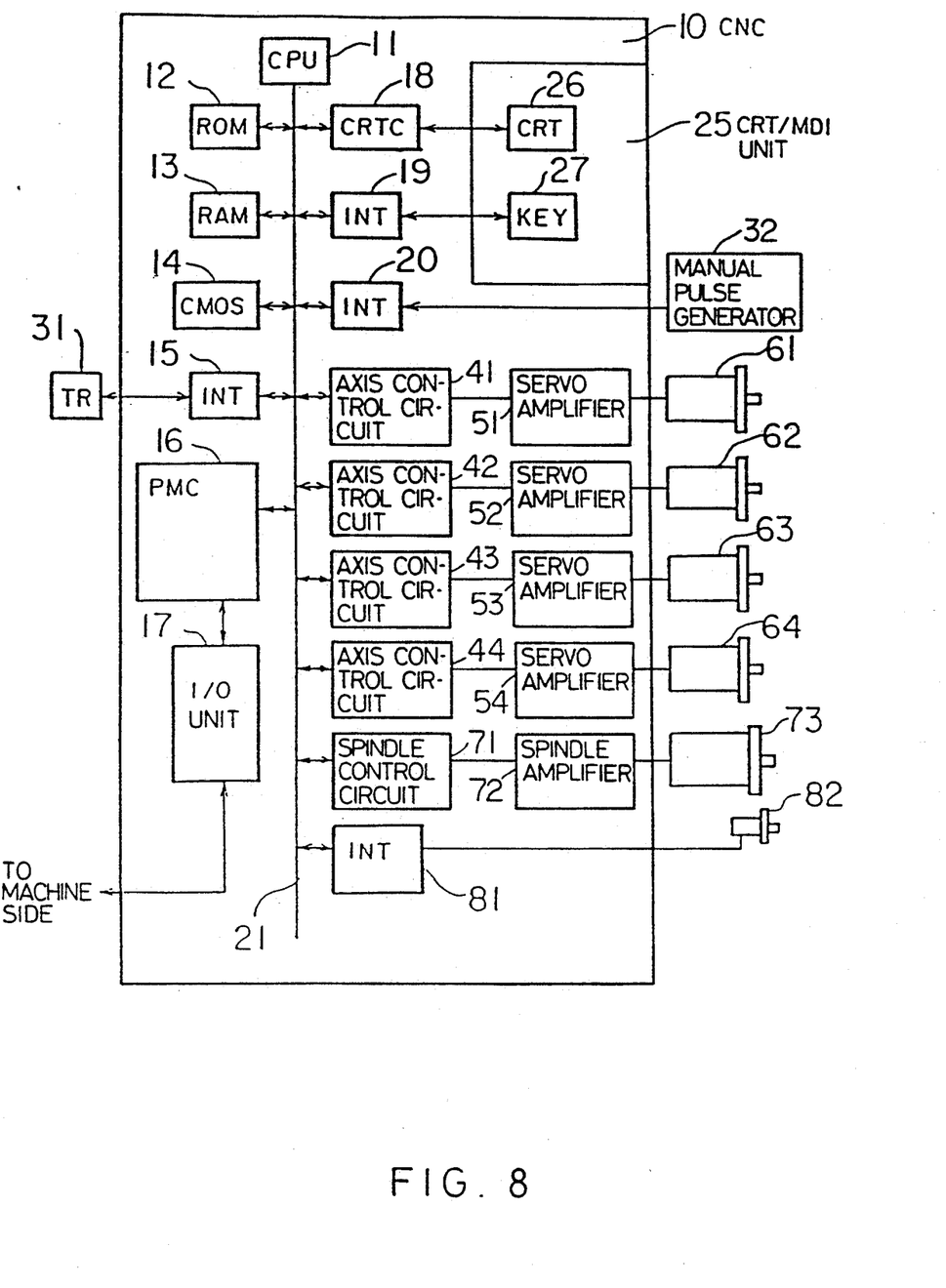
FIG. 8 is a block diagram of hardware of a numerical control device (CNC) for carrying out this invention.

FIG. 8 shows the hardware of a numerical control device (CNC) for carrying out this invention. In the figure, reference numeral 10 denotes a numerical control device (CNC), and a processor 11, which globally controls the numerical control device (CNC) 10, reads out a system program stored in a ROM 12 through a bus 21, and controls the entire operation of the numerical control device (CNC) 10 in accordance with the system program. A RAM 13 temporarily stores calculation data and display data, etc., and comprises an SRAM, for example. A CMOS 14 stores tool correction values, pitch error correction values, a machining program, parameters and the like, and comprises a nonvolatile memory backed up by a not shown battery so that the data therein is retained even after the power supply to the numerical control device (CNC) 10 is cut off.

An interface 15 for external devices is connected to an external device 31, such as a paper tape reader, paper tape puncher, paper tape reader/puncher, etc. The paper tape reader is used to read a machining program, and the paper tape puncher is used for outputting a machining program edited in the numerical control device (CNC) 10.

A PMC (programmable machine controller) 16, which is built into the CNC 10, controls the machine in accordance with a sequence program prepared in a Ladder format. Namely, the PMC converts M, S and T functions, specified by the machining program, into signals required on the machine side in accordance with the sequence program, and outputs the converted signals to the machine side through an I/O unit 17. The output signals drive magnets, etc., on the machine side, to thereby actuate hydraulic valves, pneumatic valves, and electric actuators, etc. Further, the PMC processes signals from Limit switches of the machine side and from switches on a machine operator panel, and supplies the processed signals to the processor 11.

A graphic control circuit 18 converts digital data representing current positions of the individual axes, alarms, parameters, and image data, etc. into image signals and outputs the converted data. The image signals are supplied to a display device 26 of a CRT/MDI unit 25 and displayed thereby. An interface 19 transfers data from a keyboard 27 of the CRT/MDI unit 25 to the processor 11.

An interface 20 is connected to a manual pulse generator 32 for receiving pulses therefrom. The manual pulse generator 32 is incorporated in the machine operator panel, and is used to manually precisely position a machine operating part.

Axis control circuits 41 to 44 receive move commands for the respective axes from the processor 11 and output commands to servo amplifiers 51 to 54, respectively, and upon receiving the move commands, the servo amplifiers 51 to 54 drive servomotors 61 to 64 associated with the respective axes. A position detection pulse coder is built into each of the servomotors 61 to 64, and a position signal therefrom is fed back in the form of a pulse train. Alternatively, a linear scale may be used as the position detector. The pulse train is subjected to an F/V (frequency-to-velocity) conversion to generate a velocity signal. In the figure, a feedback line for the position signal and a velocity feedback are omitted.

The servomotors 61 to 64 are associated respectively with the X, Y, Z and C axes.

A spindle control circuit 71 receives a spindle rotation command and a spindle orientation command, etc., and outputs a spindle velocity signal to a spindle amplifier 72, and upon receiving the spindle velocity signal, the spindle amplifier 72 rotates a spindle motor 73 at the specified speed. The spindle is positioned at a predetermined position in accordance with the orientation command.

A position coder 82 is coupled to the spindle motor 73 by gears or a beat, and thus the position coder 82 is rotated synchronously with the spindle motor 73, and a feedback pulse output therefrom is supplied to the processor 11 through an interface 81, and read thereby. This feedback pulse is used to move the other axes synchronously with the spindle motor 73, for carrying out a machining such as thread cutting.

Figure 1:
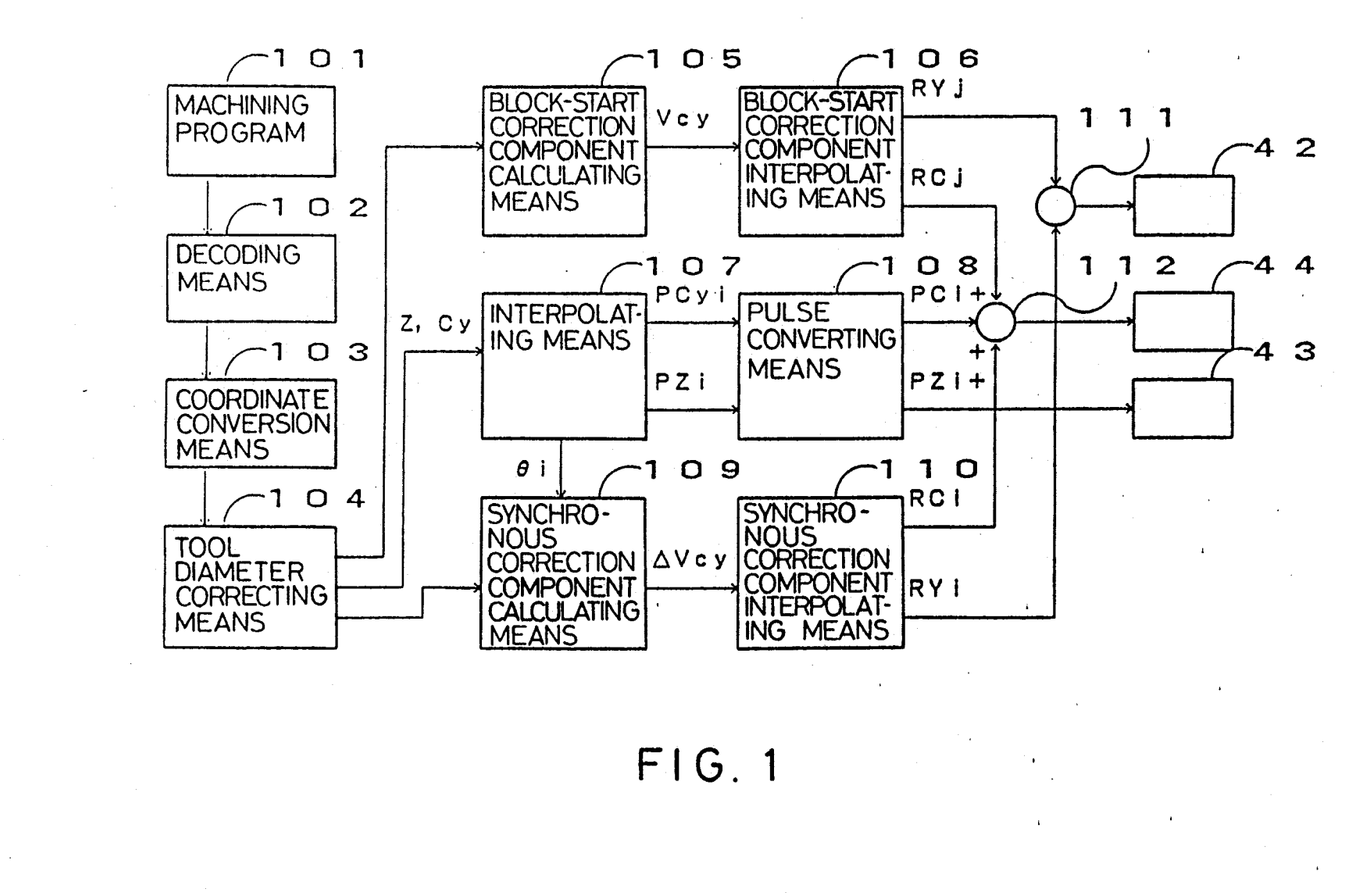
FIG. 1 is a block diagram illustrating various means composing a cylindrical interpolation system according to this invention.

FIG. 1 is a block diagram illustrating various means incorporated in the cylindrical interpolation system according to this invention. These means are operated by the processor 11 in accordance with the system program stored in the ROM 12.

Here it is assumed that a machining program 101 dictates a Z-axis command and a C-axis command, and that the C-axis command is dictated in units of angles. A decoding means 102 decodes this command and determines that it is a cylindrical interpolation command, and then a coordinate conversion means 103 converts the C-axis rotation command into an assumed linear axis Cy on an assumed plane. Namely, the coordinates specified in angles of rotation are converted into a distance on the cylindrical surface of the workpiece 2 corresponding to the rotation angle.

Namely, commands in the machining program 101 are decoded by the decoding means 102, and the C-axis command is converted by the coordinate conversion means 103 into values with reference to the assumed linear axis Cy. Then, based on these commands, a tool diameter correcting means 104 obtains a tool center path in accordance with a program path with respect to the Z axis and the assumed linear axis Cy, and the tool diameter r, i.e., the tool diameter correcting means 104 outputs a command value representing the center path of the tool 1.

Namely, the tool diameter correcting means 104 outputs a move command Z for the tool 1 and a command Cy with respect to the assumed linear axis, to the interpolating means 107, and further supplies a tool radius offset vector to the block-start correction component calculating means 105, and a tool radius and an offset direction to the synchronous correction component calculating means 109.

The interpolating means 107 interpolates the commands Z and Cy, and outputs an interpolation pulse PCyi related to the assumed linear axis, and an interpolation pulse PZi related to the Z axis, to the pulse converting means 108. The pulse converting means 108 converts the interpolation pulse PCyi into an interpolation pulse PCi related to the rotary axis (C axis), as indicated by the following equation (2):

$$PCi = (PCyi/R) * (180/\pi) \qquad (2)$$

where R represents the radius of the workpiece 2.

The block-start correction component calculating means 105 obtains a correction component Vcy of the tool contact vector in the direction of the assumed linear axis, as shown in FIG. 5, from the tool diameter offset vector. The tool contact vector differs from the tool diameter offset vector only in direction, and thus the correction component can be derived by obtaining a tool contact vector from the tool diameter offset vector and obtaining an assumed linear axis component of its vector of rotation, as shown in FIG. 5.

The correction component Vcy is interpolated by the block-start correction component interpolating means 106, and is output therefrom as a correction pulse RYj for the Y axis and a correction pulse RCj for the rotary axis. The sum of the correction pulses RYj is equivalent to the distance between the points P and Q on the cylindrical surface 2a in the Y-axis direction, as shown in FIG. 3. The C axis is rotated by $\theta$, as shown in FIG. 3, in accordance with the correction pulse RCj.

When the tool contact vector is rotated between successive blocks, e.g., the center of the tool 1 is at the point P2 in FIG. 7, the block-start correction component calculating means 105 calculates a correction component. The interpolation by the block-start correction component interpolating means 106 is effected before an interpolation for the movement of the tool 1 from P2 to P3.

The synchronous correction component calculating means 109 calculates a correction component when the tool contact vector varies at each interpolation of the interpolating means 107, e.g., in a circular interpolation shown in FIG. 6, involute interpolation, or the like. Namely, when the tool contact vector changes from VC0 to VC1, as shown in FIG. 6, an assumed linear axis component $\Delta Vcy$ corresponding to the change of the tool contact vector is obtained and supplied to the synchronous correction component interpolating means 110. The synchronous correction component interpolating means 110 interpolates the correction component $\Delta V_{cy}$ each time the interpolating means 107 carries out an interpolation, and outputs a correction pulse RCi for the C axis and a correction pulse RYi for the Y axis. These correction pulses RCi and RYi are output from the interpolating means 107 synchronously with the interpolation pulses PCi and PZi.

The correction pulses RYj and RYi for the Y axis are added at an adder 111, and the result is supplied to the axis control circuit 42 as an output pulse for the Y axis. In this case, the correction pulses RYi and RYi are not output at the same time.

The correction pulse RCj, interpolation pulse PCi and correction pulse RCi for the C axis are added at an adder 112, and the result is supplied to the axis control circuit 44. The correction pulse RCi and the interpolation pulse PCi are superimposed when output.

The interpolation pulse PZi for the Z axis is supplied to the axis control circuit 43.

As described above, the C axis is rotated and the Y axis is moved in accordance with an assumed linear axis component corresponding to the change of the tool contact vector, whereby the tool cutting surface is located immediately above the axis of rotation of the workpiece and the side surface being machined is brought to a position perpendicular to the cylindrical surface of the workpiece.

In the above description, the Z, C and Y axes represent a cylindrical axis, a rotary axis, and an axis perpendicular to the cylindrical axis, respectively, but these axes are named only for explanation purposes, and may be modified depending on the arrangement of the machines.

Further, in the above description, the rotary axis command in the machining program is dictated in terms of angles, but command values which have been converted with reference to the assumed linear axis by a programming system may be alternatively used. In this case, the coordinate conversion means shown in FIG. 1 is not necessary.

As described above, according to this invention, the Y axis is moved by an assumed linear axis component corresponding to the change of the tool contact vector, and at the same time, the rotary axis is rotated by a cylindrical interpolation to carry out a tool position correction, whereby the tool cutting surface is always located immediately above the axis of rotation of the workpiece and the side surface being machined is at a right angle to the cylindrical surface of the workpiece.

We claim:

1. A cylindrical interpolation system for machining a cylindrical surface of a cylindrical workpiece, comprising:

tool diameter correcting means for obtaining a tool center path by calculating a tool diameter offset vector in an assumed plane defined by a cylindrical axis and an assumed linear axis obtained through a development of the cylindrical surface;

interpolating means for interpolating the tool center path and outputting a first interpolation pulse related to the assumed linear axis and a second interpolation pulse related to the cylindrical axis;

pulse converting means for converting the first interpolation pulse into a third interpolation pulse related to a rotary axis;

correction component calculating means for calculating a correction component of a tool contact vector in a direction of the assumed linear axis from the tool diameter offset vector;

correction component interpolating means for interpolating the correction component and outputting a first correction pulse related to the rotary axis and a second correction pulse related to an axis perpendicular to the cylindrical axis; and an adder for adding the third interpolation pulse and the first correction pulse and providing an output pulse for the rotary axis.

2. A cylindrical interpolation system according to claim 1, wherein said correction component calculating means comprises block-start correction component calculating means for obtaining a correction component between the tool contact vectors of successive blocks, and synchronous correction component calculating means for calculating a correction component for each interpolation.

3. A cylindrical interpolation system according to claim 1, wherein said correction component interpolating means comprises block-start correction component interpolating means for interpolating a block-start correction component before an interpolation by the interpolating means, and synchronous correction component interpolating means for interpolating a synchronous correction component synchronously with each interpolation by the interpolating means.

4. A cylindrical interpolation system according to claim 1, wherein said cylindrical axis comprises a Z axis, the rotary axis comprises a C axis, and the axis perpendicular to the cylindrical axis comprises a Y axis.

5. A cylindrical interpolation system according to claim 1, wherein an axis rotation command in a machining program is dictated in terms of angles of rotation, and the system further comprises coordinate conversion means for converting the axis rotation command into a linear command value related to the assumed linear axis on the cylindrical surface.

6. A cylindrical interpolation system according to claim 1, wherein an axis rotation command in a machining program is dictated as an amount of movement along the assumed linear axis.

* * * * *